Nov. 13, 1934.     F. V. A. E. ENGEL     1,980,672
ORIFICE PLATE FOR FLOW METERS
Filed Nov. 30, 1931
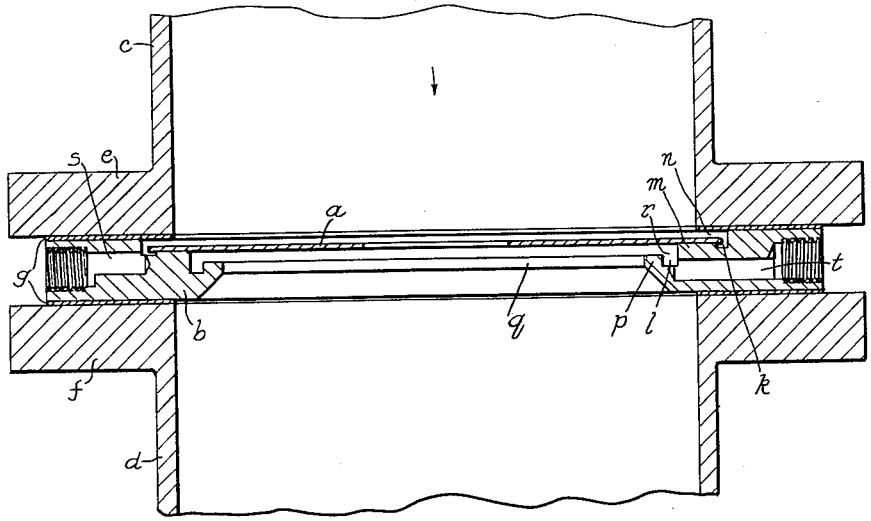
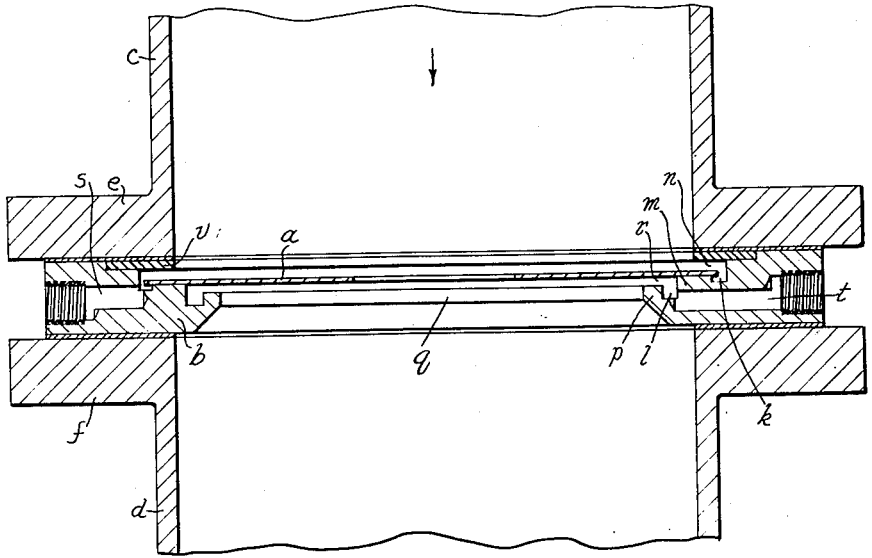
Inventor
Friedrich Viktor Anton Ernst Engel
by James B. Lawis
Attorney Patented Nov. 13, 1934

1,980,672

UNITED STATES PATENT OFFICE 1,980,672

ORIFICE PLATE FOR FLOW METERS

Friedrich Viktor Anton Ernst Engel, London, England, assignor to Republic Flow Meters Company, Chicago, Ill., a corporation of Illinois Application November 30, 1931, Serial No. 578,009
In Germany December 2, 1930

5 Claims. (Cl. 73—187)

This invention relates to measuring rings for use in connection with fluid flow meters adapted to be operated by the differential pressure obtainable from the opposite sides of a measuring ring arranged in a pipe line or conduit and has particular reference to the means employed for mounting the measuring rings in position.

In the past, measuring rings have been mounted in position between the opposed faces of the flanges of a pair of adjacent lengths of piping by the aid of a pair of carrier rings which are disposed one on each side of the measuring ring and each of which is formed with a suitable pressure collecting chamber. Such carrier rings possess certain inherent disadvantages since, firstly, if accurate measurements are to be obtained, the internal diameters of the carrier rings must correspond with the internal diameter of the piping and, secondly, a fairly large space is required for installing the rings in position between the pipe flanges. The chief object of the present invention is to provide an improved form of mounting means which is capable of being used with a large range of pipe diameters without introducing errors of measurement and with which the space needed for installation is materially reduced.

According to the invention, the measuring ring is mounted upon, and adapted to be held in position in a pipe line by a single relatively thin carrier ring having a pair of pressure collecting chambers formed therein. The collecting chambers may be constituted by a pair of annular or arcuate grooves formed in the carrier ring and suitable passages are formed for enabling communication to be established between the pressure collecting chambers and the opposite sides of the measuring ring.

In order that the said invention may be clearly understood and readily carried into effect the same will now be described with reference to the accompanying drawing which illustrates, by way of example, two convenient modes of carrying the invention into effect and in which:—

Figure 1 is a section through one form of carrier ring embodying the invention and mounted in position between the flanges of a pair of lengths of piping, and Figure 2 is a similar view of a modified form of carrier ring.

In Fig. 1 of the accompanying drawing, $a$ is the measuring ring, $b$ is the carrier ring and $c$ and $d$ are the pipes between the flanges $e$ and $f$ on which the carrier ring is mounted, suitable packing rings or gaskets $g$ being disposed between the side walls of the carrier ring and the adjacent faces of the flanges $e$ and $f$. The pressure collecting chambers are indicated at $k$ and $l$ and are provided by forming a pair of concentric annular or arcuate grooves in one face of the carrier ring, the outer diameter of the groove $k$ being greater than the outer diameter of the measuring ring $a$, the inner diameter of the groove $k$ preferably being smaller than the outer diameter of the measuring ring $a$, and the part $m$ between the grooves $k$ and $l$ being reduced in thickness and the measuring ring being suitably secured thereto, as by bolts, so that a gap $n$ is left between the outer face of the measuring ring and the adjacent face of the flange $e$ for leading the pressure on the upstream side of the measuring ring to the collecting chamber $k$. The part $p$ between the inner groove $l$ and the central opening $q$ in the carrier ring is also reduced in thickness so that another gap $r$ is formed under the measuring ring for leading the pressure on the downstream side thereof to the collecting chamber $l$. The pressure collecting chambers $k$ and $l$ are also each formed with a radially disposed outlet, indicated at $s$ and $t$ respectively, to which suitable tubes may be connected for enabling the pressures to be led to the differential pressure measuring instrument.

The embodiment illustrated in Fig. 2 of the accompanying drawing is similar in all essential respects to that illustrated in Figure 1 and like parts are similarly designated. In this instance, however, a metal joint ring $v$ is disposed between the inner edge of the packing $g$ on the upstream side and the opposite edge of the carrier ring $b$ in order to prevent any possibility of a part of packing being forced into the entrance to the high pressure collecting chamber $k$, the joint ring being accommodated in a suitable recess formed in the upstream face of the carrier ring.

From the foregoing, it will be appreciated that the present invention provides an improved form of carrier ring which is, within limits, independent of the diameter of the pipe line and which can readily be mounted in position even where the space available between the pipe flanges is small. In the arrangement illustrated in Fig. 2, the carrier ring can also be adapted for use with pipe lines of different diameters by choosing a joint ring having a suitable internal diameter. Moreover, in this arrangement the width of the inlet to the high pressure collecting chamber has a fixed value thereby enabling extremely accurate measurements of the rates of flow to be obtained and, as the arrangement is independent of the thickness of the packing, a standard packing can be used between the carrier ring and the pipe flanges.

Having now particularly described and ascertained the nature of my said invention and in what manner the same is to be performed I declare that what I claim is:—

1. A differential pressure producing device, comprising a ring for insertion between adjacent flanges of a conduit, and having stepped down portions in one face thereof and a groove in each of said stepped down portions, said ring having a pressure connection extending from the outer periphery and communicating with each of said grooves and an orifice plate carried by the first stepped down portion.

2. A differential pressure producing device, comprising a relatively thin ring for insertion between adjacent flanges of a conduit and having concentrically stepped down portions in one face thereof, the inner stepped down portion being of greater depth than the first stepped down portion, said ring having grooves in each of said stepped down portions and pressure inlets extending from said grooves to the outer periphery of said ring, and an orifice plate carried by said first stepped down portion.

3. A pressure differential producing device, comprising a ring for insertion in a conduit and having concentrically arranged stepped down portions in one face thereof, there being grooves in each of said stepped down portions and ports communicating with said grooves for transmitting the pressures therefrom to the exterior of a ring and an orifice plate carried by said first named stepped down portion and extending slightly over the inner edge of the groove in said portion.

4. A differential pressure producing device, comprising a relatively thin ring having three stepped down portions in one face thereof, the two inner portions having grooves formed therein and ports extending from said grooves to the outer periphery of said ring for the transmission of pressures therefrom, an orifice plate seated on the intermediate stepped down portion and extending partially over the grooves therein and a ring seated in said first stepped down portion and extending over the peripheral edges of said orifice plate to form therewith a passageway leading to the groove in the said second stepped down portion.

5. A differential pressure producing device, comprising a ring for insertion in a conduit and having an opening therethrough of less diameter than said conduit and having three stepped down portions in one face thereof, the two inner portions being of greater depth than the outer portion and having grooves formed therein, ports extending from said grooves to the outer periphery of said ring for transmitting the pressure therein to the exterior of the ring, an orifice plate seated on the intermediate stepped down portion and a ring seated in the outer stepped down portion and being of the same internal diameter as that of the conduit.

FRIEDRICH VIKTOR ANTON ERNST ENGEL.